United States Patent [19]

Maron

[11] Patent Number: 5,767,411

[45] Date of Patent: Jun. 16, 1998

[54] APPARATUS FOR ENHANCING STRAIN IN INTRINSIC FIBER OPTIC SENSORS AND PACKAGING SAME FOR HARSH ENVIRONMENTS

[75] Inventor: Robert J. Maron, Cromwell, Conn.

[73] Assignee: Cidra Corporation, Wallingford, Conn.

[21] Appl. No.: 777,271

[22] Filed: Dec. 31, 1996

[51] Int. Cl.$^6$ ............................................. G02B 5/14
[52] U.S. Cl. ................................................... 73/705
[58] Field of Search ................ 73/800, 706, 862.624, 73/705; 356/32; 250/227.14, 227.18; 367/149, 154, 166, 169, 171

[56] References Cited

U.S. PATENT DOCUMENTS

| | | | |
|---|---|---|---|
| 4,235,113 | 11/1980 | Carome | 385/12 |
| 4,547,869 | 10/1985 | Savit | 367/149 |
| 4,589,285 | 5/1986 | Savit | 73/655 |
| 4,649,529 | 3/1987 | Avicola | 367/149 |
| 4,722,603 | 2/1988 | Graebner et al. | 356/345 |
| 4,761,073 | 8/1988 | Meltz et al. | 356/32 |
| 4,825,424 | 4/1989 | Lamb et al. | 367/141 |
| 4,862,424 | 8/1989 | Graebner et al. | 367/33 |
| 4,996,419 | 2/1991 | Morey | 250/227.18 |
| 5,163,321 | 11/1992 | Perales | 73/151 |
| 5,227,857 | 7/1993 | Kersey | 356/345 |
| 5,361,130 | 11/1994 | Kersey et al. | 356/345 |
| 5,363,463 | 11/1994 | Kleinermann | 385/123 |
| 5,380,995 | 1/1995 | Udd et al. | 250/227.18 |
| 5,397,891 | 3/1995 | Udd et al. | 250/227.18 |
| 5,400,427 | 3/1995 | Ashjian et al. | 385/102 |
| 5,401,956 | 3/1995 | Dunphy et al. | 250/227.18 |
| 5,410,404 | 4/1995 | Kersey et al. | 356/345 |
| 5,426,297 | 6/1995 | Dunphy et al. | 250/227.23 |
| 5,444,803 | 8/1995 | Kim et al. | 385/28 |
| 5,451,772 | 9/1995 | Narendran | 250/227.19 |
| 5,485,745 | 1/1996 | Rademaker et al. | 73/151 |
| 5,493,113 | 2/1996 | Dunphy et al. | 250/227.19 |
| 5,493,390 | 2/1996 | Varasi et al. | 73/800 |
| 5,495,237 | 2/1996 | Yuasa et al. | 340/854.6 |
| 5,574,699 | 11/1996 | Cuomo | 367/154 |
| 5,625,605 | 4/1997 | Sullivan et al. | 367/154 |

*Primary Examiner*—Robert Raevis

[57] ABSTRACT

A sensor system for sensing a measurand field within an environment includes an optical source, such as a light emitting diode, for providing broadband light to an array of serially coupled sensor elements disposed within an optical fiber. Each sensor element includes a fiber grating (Bragg grating) which, when illuminated, reflects a narrow band of light having a specified central wavelength. The optical fiber is deployed in a high strength hermetically sealed capillary tubing structure. Within the capillary tube, at least in the area of the sensor elements, the capillary tubing is filled with a high-density, low-compressibility, and high thermal conductivity material, such as a liquid, which completely fills all of the void spaces within the capillary tubing between the tubing and the sensor elements such that compressive forces which are exerted on the external surfaces of the tubing are accurately transmitted to the sensor element.

44 Claims, 2 Drawing Sheets

APPARATUS FOR ENHANCING STRAIN IN INTRINSIC FIBER OPTIC SENSORS AND PACKAGING SAME FOR HARSH ENVIRONMENTS

TECHNICAL FIELD

The present invention relates to fiber optic sensors, and more particularly, to a sensor system for enhancing strain in an intrinsic fiber optic sensor and packaging of such a fiber optic sensor for use in extremely harsh environments.

BACKGROUND OF THE INVENTION

Intrinsic fiber optic sensors have recently been developed in which a physical measurand, such as temperature or pressure, modulates the light being transmitted through an optical fiber. When the physical parameter affecting the optical fiber is a parameter of interest, measurement of the modulated light in the fiber with a suitable instrumentation system thus permits measurement of the physical parameter of interest. In such a sensor system, the sensor head is intrinsic to the fiber.

One such class of intrinsic fiber optic sensor relies on creating a strain in the optical fiber caused by a physical measurand, such as a time-varying acoustic pressure. Such sensors may be interferometric in nature, or may rely on intracore fiber Bragg gratings. Since these intrinsic sensors require no additional apparatus at the sensor point other than the optical fiber, their small size offers significant advantages in many applications. However, in some harsh-environment applications, the bare fiber can not be directly exposed to the medium in which the physical signal is present without being severely damaged. This damage may occur either because of physical damage during installation of the sensor, or after installation due to the effects of high temperature and pressure, the presence of corrosive chemicals, and various other factors. An example of such an application is the measurement of acoustic pressure fluctuations downhole in oil and gas wells.

In such applications in extremely harsh environments of oil and gas wells, some fiber optic sensors have been deployed inside air-filled, small diameter, corrosion resistant metal tubes, sometimes called capillary tubes. Such capillary tubes are closed at the downhole end, and thus provide a mechanical and hermetic barrier between the fiber optic sensor and the harsh downhole environment. To date, sensors deployed downhole have either been of the type which detect temperature, or single-point extrinsic pressure sensors located at the downhole end of a fiber. No previous use of intrinsic fiber optic sensors for the downhole sensing of acoustic pressure fluctuations is known at this time, although this type of sensor has been used for towed array acoustic sensors in open water. The open water environment is relatively benign, compared to the downhole environment, and thus the fiber can be deployed with a relatively soft coating. However, such coatings will not withstand the downhole environment.

A problem associated with deploying an intrinsic fiber optic acoustic sensor inside a capillary tube, for protection from the downhole environment, is that severe attenuation of the acoustic signal occurs as it passes through the wall of the metal tube. This severe attenuation prevents the detection of useful signals, and/or requires elaborate high-sensitivity instrumentation systems that are costly and impractical for commercial use. There therefore exists the need for an intrinsic fiber optic sensor, which is particularly sensitive for measuring acoustic pressure fluctuations, wherein the fiber optic sensor is protected from damage in a harsh environment, while minimizing the acoustic transmission loss associated with protecting the fiber optic sensor from the harsh environment.

SUMMARY OF THE INVENTION

Objects of the present invention include the provision of a sensor system for deploying an intrinsic fiber optic sensor in a harsh environment wherein the fiber and intrinsic fiber optic sensor are protected from the harsh environment while maintaining a high degree of sensitivity to the physical parameters which the intrinsic fiber optic sensor is capable of measuring.

Another object of the present invention is to provide such an intrinsic fiber optic sensor and sensor system having a high degree of sensitivity to changes in acoustic pressure and other strain in the environment in which the sensor is deployed.

A still further object of the present invention is to provide such a sensor system and intrinsic fiber optic sensor which accurately and rapidly reacts to changes in temperature in the environment in which the sensor is deployed.

According to the present invention, a sensor system for sensing a measurand field in an environment includes an optical source for providing broadband light to an array of serially coupled intrinsic fiber optic sensor elements disposed within an optical fiber, each sensor element including a fiber grating (Bragg grating) formed in a core of the optical fiber which, when illuminated, reflects a narrow band of light having a specified central wave-length, the optical fiber being deployed in a high strength hermetically sealed capillary tubing structure which is impervious to penetration by elements in the environment, the capillary tubing being formed of material which is transmissible to temperature, but which is only slightly compressible and can withstand a high degree of compressive forces without collapsing such that the sensor system can be deployed in an environment wherein extremely high temperatures and pressures exist. Within the capillary tube, at least in the area of the sensor elements, the capillary tubing is filled with a high-density, low-compressibility material which completely fills all of the void spaces within the capillary tubing between the tubing and the sensor elements such that compressive forces which are exerted on the external surfaces of the tubing are accurately transmitted to the sensor elements to thereby cause a strain in the optical fiber with a very low loss associated with attenuation or dispersion of the compressive forces within the high density, low compressibility material.

According still further to the present invention, the high density, low compressibility material may be selected such that the material is highly thermal conductive so that the temperature in the environment in which the sensor is employed is accurately and rapidly transmitted through the capillary tubing and material to the optical fiber contained therein.

In still further accord with the present invention, the high density and low compressibility material may be a liquid, such as water, glycerine, oil, or other suitable high density, low compressibility and highly thermal conductive liquid, which completely fills the void between the internal surfaces of the capillary tubing and the external surfaces of the optical fiber, at least in the region of the sensor elements.

The sensor, system of the present invention provides a significant improvement over the prior art because the physical properties of the environment in which the fiber optic sensor of the present invention is deployed are accurately transmitted from the environment through the capillary tubing and material to the fiber optic sensors contained therein. Therefore, much less complicated and less expensive analysis equipment may be employed to analyze signals provided by the sensors for providing an accurate representation of the physical environment in which the sensor system of the present invention is employed. Additionally, the system of the present invention provides for the reliable protection of the optical fiber contained within the capillary tubing such that the optical fiber and sensors are protected from the harsh environment including corrosive chemicals, mechanical impact, and other conditions which an optical fiber would be subjected to in such an environment. A further advantage of the present invention may be realized if the high density, low compressibility material filling the void spaces within the capillary tubing is highly thermal conductive. Therefore, the temperature in the environment in which the sensor is employed is accurately and rapidly transmitted through the capillary tubing and material to the optical fiber contained therein.

The foregoing and other objects, features and advantages of the present invention will become more apparent in light of the following detailed description of exemplary embodiments thereof.

DETAILED DESCRIPTION OF THE INVENTION

The sensor system of the present invention is particularly well suited for measuring dynamic pressure fluctuations such as acoustic pressure and/or temperature in an extremely harsh environment. In particular, the present invention utilizes resonant structures, called Bragg gratings, which are disposed at multiple locations within a waveguide core of an optical fiber for measuring the physical characteristics of an environment in which the sensor is located.

Figure 1:
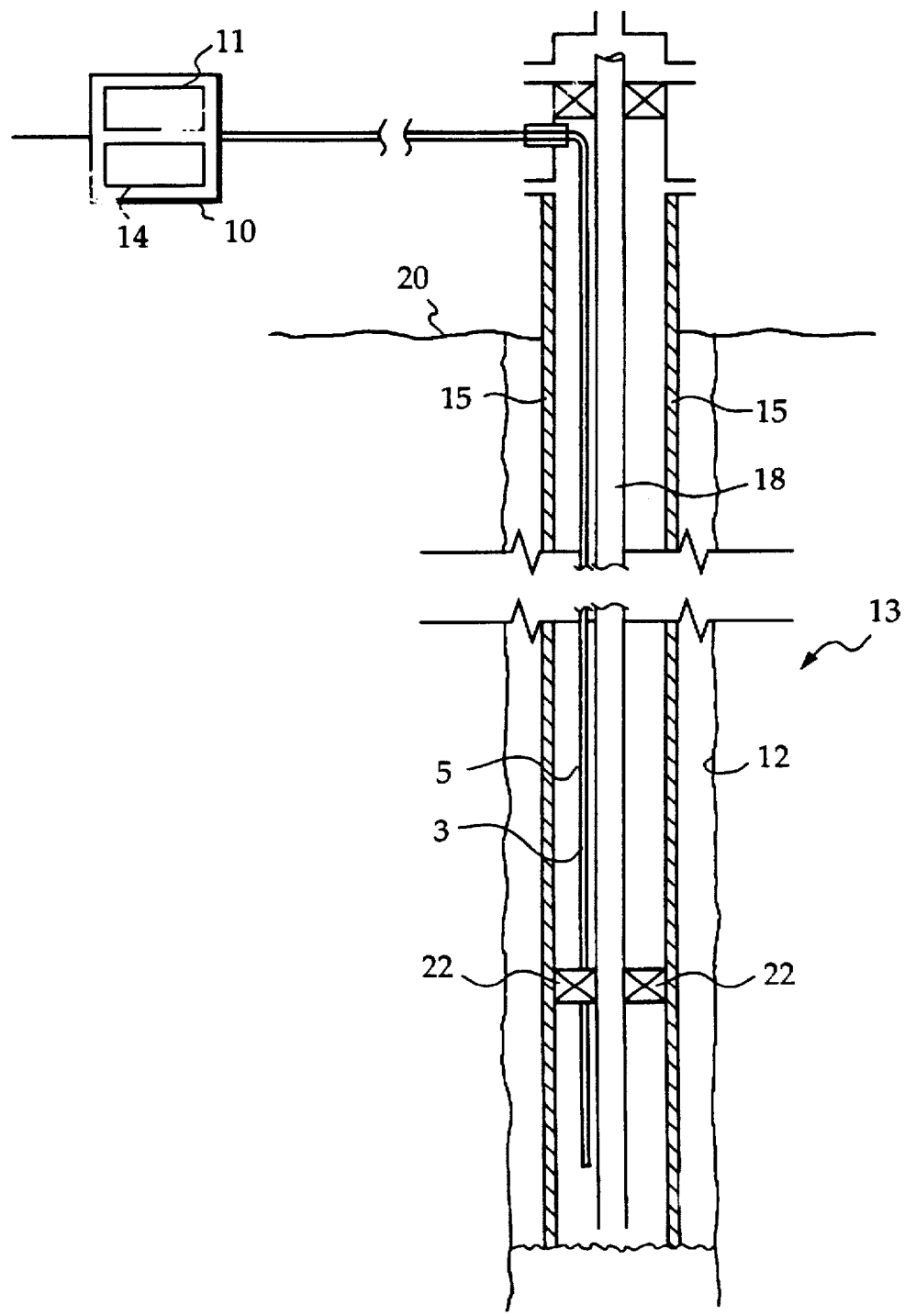
FIG. 1 is a schematic block diagram of the sensor system of the invention utilized in an earth borehole of an oil or gas well.

Referring now to FIG. 1, an optical sensor string 3 includes optical sensor elements imbedded or formed within the core of an optical fiber 28 (FIG. 2) which is positioned within a capillary tube 5. As is known to those skilled in the arts, fiber gratings (Bragg gratings) are well suited for use as sensing elements. When a fiber grating is illuminated, the grating reflects a narrow band of light having a specified central wavelength. However, a measurand, such as strain induced by pressure, will induce a perturbation of the grating sensor spacing due to overall fiber elongation, and of the refractive index of the glass due to photoelastic effects, which together change the wavelength of the light reflected by the grating. The value of the measurand is directly related to the wavelength reflected by the grating and can be determined by detecting the wavelength of the reflected light.

As is further known in the art, the wavelength encoded nature of the output of fiber gratings has advantages over intensity based sensing techniques because of the self-referencing nature of the output. This sensed information is encoded directly into the wavelength, which is an absolute parameter and does not depend upon total light levels, losses in fibers or couplers, or variations in source intensity. In contrast, intensity-based sensing schemes depend upon total light levels and are affected by losses in the connected fibers, by losses in couplers, and by variations in source intensity.

Referring back to FIG. 1, the optical sensor string 3 and capillary tubing 5 are interconnected to optical signal processing equipment 10 via well-known capillary tube delivery equipment (not shown) for delivering the optical sensor string 3 within the capillary tubing 5 down a wellbore 12 of an oil and/or gas well 13. The tubing delivery equipment provides for the delivery of the capillary tubing 5 and optical sensor string 3 down the wellbore 12, and for the delivery of optical signals between the optical signal processing equipment 10 and the optical sensor string 3, either directly or via interface equipment (not shown) as required.

The optical signal processing equipment 10 includes, at a minimum, a broadband source of light 11, such as a light emitting diode (LED), and appropriate light filtering equipment for delivery of signal light to Bragg gratings included within the optical sensor string 3, as described in greater detail below. Additionally, the optical signal processing equipment 10 includes appropriate optical signal analysis equipment 14 for analyzing the return signals from the Bragg gratings. For example, the signal analysis equipment may include the necessary hardware and software to implement the optical signal diagnostic equipment disclosed in U.S. Pat. Nos. 4,996,419; 5,401,956; 5,426,297; and/or 5,493,390, the disclosures of which are incorporated herein by reference.

As is well known in the art, there are various optical signal analysis approaches which may be utilized to analyze return signals from optical fiber Bragg gratings. These approaches may be generally classified in the following four categories:

1. Direct spectroscopy utilizing conventional dispersive elements such as line gratings, prisms, etc., and a linear array of photo detector elements or a CCD array;
2. Passive optical filtering using both optics or a fiber device with wavelength-dependent transfer function, such as a WDM coupler;
3. Tracking using a tuneable filter such as, for example, a scanning Fabry-Perot filter, an acousto-optic filter such as the filter described in the above referenced U.S. Pat. No. 5,493,390, or fiber Bragg grating based filters; and
4. Interferometric detection.

The particular technique utilized will vary, and will depend on the Bragg wavelength shift magnitude (which depends on the sensor sensitivity and measurand strength) and the frequency range of the measurand to be detected.

As will be further understood by those skilled in the art, the optical signal processing equipment may operate on a principle of wave-division multiplexing as described above wherein each bragg grating sensor is utilized at a different passband or frequency band of interest. Alternatively, the present invention may utilize time-division multiplexing for obtaining signals from multiple independent sensors, or any other suitable means for analyzing signals returned from a plurality of Bragg grating sensors formed in an fiber optic sensor string.

In the example, of the present invention, the sensor of the invention is utilized to measure pressure and/or temperature within the wellbore 12 of the oil and/or gas well 13. Within the wellbore 12 are casing strings 15, production tubing 18, and a production packers 22. The optical sensor string 3 is interconnected via appropriate optical fibers, couplers, etc., to the optical signal processing equipment 10, which is located above the surface 20 of the wellbore 12.

Figure 2:
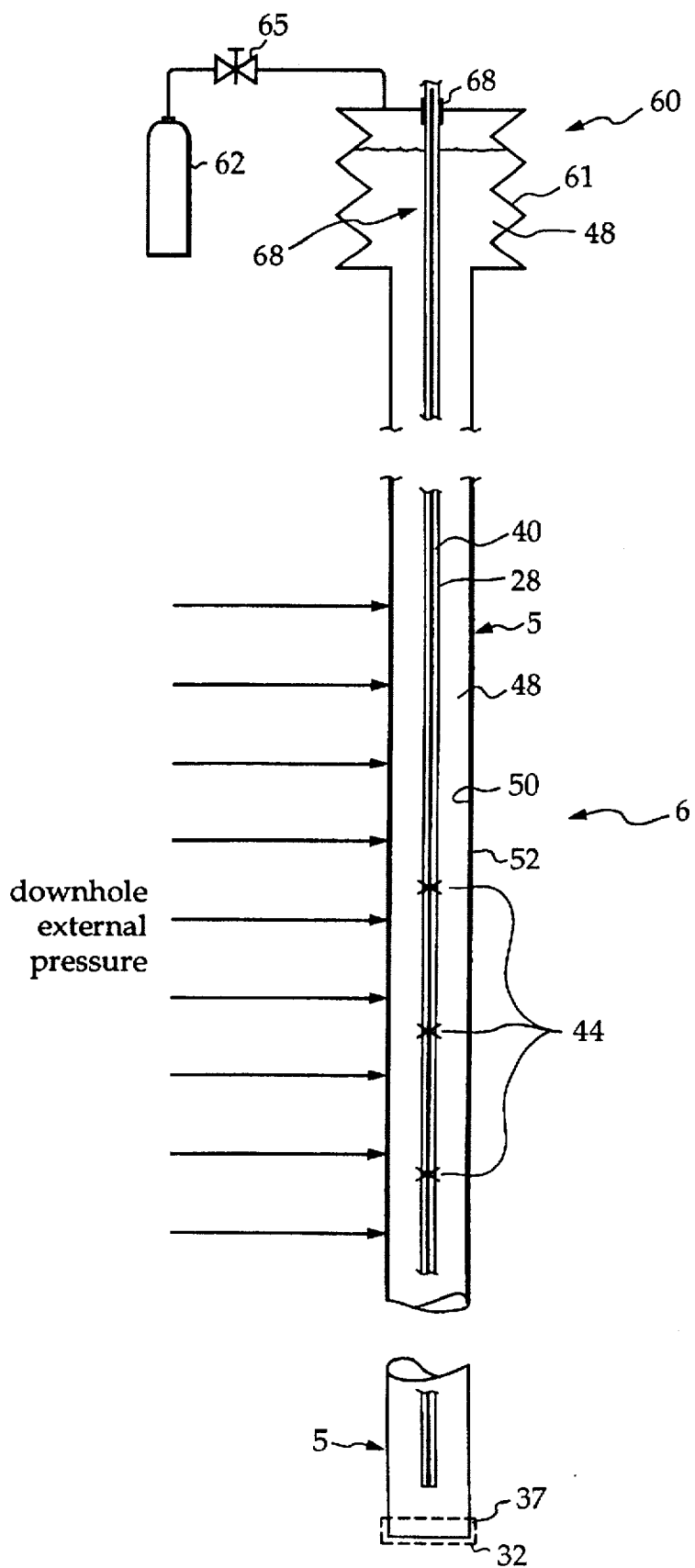
FIG. 2 is a more detailed schematic block diagram of the sensor system of the present invention.

Referring now to FIG. 2, the fiber optic sensor 6 of the invention includes an optical fiber 28 which is protected from mechanical damage and corrosive damage by placing it in the rigid wall capillary tube 5. The capillary tubing 5 may be made of a high strength, corrosion resistant material, such as stainless steel. A distal end 32 of the tube 5 is sealed, for example, by welding on an end cap 37. Alternatively, the distal end 32 of the tube 5 may be crimped and welded, or other suitable method may be utilized to hermetically seal the end of the tubing to prevent any material from the environment in which the tubing is placed from entering inside of the tubing where the optical fiber and fiber optic sensors are located.

Within the core 40 of the optical fiber 28 are formed a plurality of Bragg gratings 44. The Bragg gratings 44 may be formed in the optical fiber by any suitable method known in the art such that the core of the optical fiber is written with periodic grating patterns (i.e., a periodic variation of refractive index) effective for reflecting the wavelength band of light launched into the core. In accordance with one embodiment of the invention, each Bragg grating 44 is constructed so as to reflect a particular wavelength or frequency of light which is propagating along the core, back in the direction of the light source from which it was launched. Each of the particular frequencies is different from the other such that each Bragg grating 44 reflects a unique frequency.

As is well-known in the art, when a Bragg grating is subject to a disturbance, such as a temperature change or a strain caused by a pressure variation, the change in the reflected central wavelength of the Bragg grating is indicative of the magnitude of the physical parameter which the Bragg grating is subjected to. Therefore, in accordance with the present invention, the Bragg grating sensor string of the invention relies on a pressure fluctuation applied to the outside of the fiber, through the capillary tubing, to in turn generate a mechanical strain in the fiber core. Additionally, the sensor string relies on a change in the index of refraction, and to a lesser degree on mechanical strain, caused by thermal expansion/contraction, in response to temperature changes.

In accordance with the present invention, the capillary tube 5 is filled with a high density, low compressibility material 48. In one embodiment of the present invention, the high density, low compressibility material is a liquid, such as water, glycerine, or oil. It is also preferred that the high density, low compressibility material have a high thermal conductivity, such that temperature variations applied to the outside of the capillary tubing are rapidly and accurately transmitted to the Bragg gratings 44 located within the core 40 of the optical fiber 28.

With the aid of the high density, low compressibility material 48 located in all the empty spaces between the inside surface 50 of the capillary tube and the outside surface of the optical fiber 28, when the outside surface 52 of the capillary tube is subjected to a pressure fluctuation, such as an acoustic pressure fluctuation, the wall of the tube undergoes a radial displacement which increases or decreases the pressure of the high density, low compressibility material filling the capillary tube 5. This pressure is in turn applied to the optical fiber 28 inside the high density, low compressibility material, thus generating a mechanical strain on the fiber 28, which modulates the light being guided through the Bragg gratings 44 located within the fiber 28.

It has been found that a sensor manufactured in accordance with the present invention has a very low acoustic transmission loss as compared to other devices in the prior art, such as prior art capillary tubes filled with a gas, either at low or high pressure. The advantages of the present invention are best understood by example. The following analysis was performed for two different capillary tubes having an outside diameter of ¼ inch (0.635 cm). One capillary tube (TUBE 1) had a wall thickness of 0.047 inch (0.119 cm) and the other capillary tube (TUBE 2) had a wall thickness of 0.024 inch (0.061 cm). The following table illustrates the attenuation of an acoustic pressure signal of unit strength applied to the outside surface of the tubing. The acoustic signal was transmitted in water over a frequency range of approximately 50 hz to 2 Khz:

TABLE 1

| TUBE | AIR AT 1 ATM 1.01 × $10^5$ n/m² | AIR AT 100 ATM 1.01 × $10^7$ n/m² | AIR AT 200 ATM 2.03 × $10^7$ n/m² | WATER | GLYCERIN |
|---|---|---|---|---|---|
| 1 | $3.5 \times 10^{-6}$ (109 dB) | $3.5 \times 10^{-4}$ (69 dB) | $7.0 \times 10^{-4}$ (63 dB) | 0.006 (44 dB) | 0.1 (20 dB) |
| 2 | $6.5 \times 10^{-6}$ (104 dB) | $6.3 \times 10^{-4}$ (64 dB) | $1.3 \times 10^{-3}$ (58 dB) | 0.09 (21 dB) | 0.2 (14 dB) |

As illustrated in the above table, for a capillary tube at one atmosphere of pressure, attenuation of an acoustic signal applied to the outside surface of the tubing causes an approximately 104 dB or 109 dB attenuation of the acoustic signal, i.e., an acoustic pressure signal of unit strength will have a magnitude of $6.5 \times 10^{-6}$ or $3.5 \times 10^{-6}$ after transmission through the air-filled capillary tube. In this case, very sophisticated and highly delicate and accurate sensing equipment is required to properly distinguish changes in an output signal which are caused by acoustic variations, which may be very small. If the pressure of the air-filled capillary tube is increased to 100 or 200 atmospheres of pressure, the attenuation drops to between 58 dB and 69 dB. This reduction in attenuation significantly improves strength of acoustic pressure signals transmitted to the sensors contained within the capillary tube. Using a capillary tube filled with a high density, low compressibility material, such as a liquid of the invention, the acoustic signal will be attenuated significantly less, approximately 14 dB to 44 dB. Therefore, in accordance with the present invention, a much improved signal strength of a signal being detected by the sensor of the invention is provided. Additionally, by using a material having a high thermal conductivity, temperature variations in the environment in which the sensors are located are rapidly and accurately transmitted to the core 40, such that the pressure signals may be accurately temperature compensated.

In the above example, it is seen that a significant decrease in the attenuation of acoustic signals transmitted to an optical fiber within a capillary tube is achieved by either increasing the pressure of the gas contained in the tube or by using a high density, low compressibility material, such as a fluid, within the tube. This advantage is realized because of the increased density of molecules within the tube which thereby provided improved transmission of acoustic signals. A reduction in acoustic signal attenuation of as little as 20 dB, which may be achieved by using a high pressure gas within the tube as illustrated above, will provide a significant advantage for the sensing of acoustic signals in certain applications.

In prior art systems utilizing air filled capillary tubing, the air has a thermal conductivity of approximately 0.025 w/m-°k. In contrast, the high density, low compressibility materials such as oil, glycerine and water have thermal conductivity of approximately 0.15, 0.3 and 0.35, respectively. For purposes of the present invention, the high density, low compressibility material should have a thermal conductivity greater than approximately 0.1 w/m-°k. Therefore, these materials have substantially improved thermal conductivity and a shorter thermal time constant as compared to prior art air filled capillary tubes. Therefore, the system of the invention has a significantly shorter response time to thermal transients.

Although the invention has been described herein as using a high density, low compressibility fluid within the capillary tubing and surrounding the optical fiber containing Bragg gratings, it is believed that other materials may be used in accordance with the present invention, such as a high density, low compressibility thermoplastic material which is injected into the tubing during manufacture and which solidifies upon cooling. It is important that if a material other than a liquid is used in the tubing of the invention, that during curing or drying or solidification of such material, stresses associated with curing do not place the fiber and Bragg grating sensors under a strain which will mask the strain induced in the fiber associated with placement of the sensor in the environment to be monitored.

Additionally, it will be understood by those skilled in the art, that if the capillary tube is filled with a liquid which is high density low compressibility, the liquid may expand when exposed to a high temperature environment. Therefore, in accordance with the invention, the surface portion of the tube is provided with a reservoir for receiving excess fluid upon fluid expansion, and for providing fluid to maintain the capillary tubing filled with fluid. For example, the reservoir may be a pressure controlled bellows structure 60, as illustrated in FIG. 2. The bellows structure 60 includes an expansion tank or holding tank 61 to hold excess fluid 48. Additionally, a pressure source 62, such as high pressure air, may be provided to maintain the fluid 48 within the bellows structure 60 at a specified pressure, for example by providing a pressure regulator 65 to maintain a specified pressure within the holding tank 61. The pressure within the bellows structure 60 may be controlled, for example by use of the regulator 65, to maintain the fluid 48 in the liquid phase when exposed to high temperatures. If the pressure in the bellows structure 60 is regulated, means 68 are provided to allow the optical fiber 28 to pass through the bellows structure 60 while sealing the structure 60 to maintain the desired pressure. As will be understood by those skilled in the art, an excess length of optical fiber 68 is provided to allow expansion and contraction of the bellows structure 60 without damaging or applying excess tension to the optical fiber 28.

Although a bellows structure is described above as providing a reservoir and pressure control, any suitable method of maintaining material 48 within the capillary tube 5 may be used. For example, the invention may be provided with an overflow reservoir without pressure control. Additionally, if a solid material is utilized, such as a polymer, no overflow is required at all.

The invention is described as using fiber Bragg gratings as sensors. The Bragg gratings are essentially described as point sensors. However, it will be understood that any suitable Bragg grating sensor configuration may be used. For example, the Bragg gratings can be used for interferometric detection wherein a length of optical fiber is positioned between a pair of Bragg grating to thereby form a resonant cavity. Alternatively, the Bragg gratings may be used to form lazing elements for detection, for example by positioning an Ebrium doped length of optical fiber between a pair of Bragg gratings. It will also be understood by those skilled in the art that the present invention will work equally as well with other types of sensors located within the capillary tubing. The benefits of the present invention are realized due to improved sensitivity of transmission of environmental pressure and temperature fluctuations to the sensors via the high density, low compressibility material.

The invention is described as being used with a hermetically sealed tube to protect the optical fiber and sensors from the harsh environment. However, it will be understood that other tube configurations may be used with the present invention, such as a "U" shaped tube, wherein both ends of the tube are above the surface of the borehole. Additionally, it will be understood that the tube may be provided in any desired configuration in the borehole, such as wrapped around the drill string, to place sensors in a desired location within the borehole.

Although the invention has been described and illustrated with respect to exemplary embodiments thereof, the foregoing and various other additions, and omission may be made therein and thereto without departing from the spirit and scope of the invention.

I claim:

1. A sensor system for sensing a measurand field in an environment, comprising:
   a capillary tubing structure including an array of serially coupled intrinsic fiber optical sensor elements formed within an optical fiber, said sensor elements and said optical fiber being deployed within a capillary tube, and said capillary tube being deployed in the environment; and
   a high-density, low-compressibility material which completely fills all void spaces within said capillary tubing structure between an internal surface of said capillary tube and said optical fiber, at least in an area of said capillary tube containing said sensor elements;
   wherein said material is responsive to a compressive force exerted on an external surface of said capillary tube within the environment for providing a fluid force, and wherein said sensor elements are responsive to said fluid force and a light signal for each providing a sensing light signal indicative of said compressive force.

2. A sensor system according to claim 1, wherein each one of said sensor elements is a Bragg grating formed in a core of said optical fiber.

3. A sensor system according to claim 1, wherein each one of said sensor elements is an interferometer including a respective pair of Bragg gratings formed in a core of said optical fiber and a sensing length of optical fiber positioned between said respective pair of Bragg gratings.

4. A sensor system according to claim 1, wherein each one of said sensor elements is a lazing element including a respective pair of Bragg gratings formed in a core of said optical fiber and a sensing length of doped optical fiber positioned between said respective pair of Bragg gratings.

5. A sensor system according to claim 1, wherein said capillary tubing structure is hermetically sealed.

6. A sensor system according to claim 1, wherein said material is selected to be thermally conductive so that the temperature in the environment is accurately and rapidly transmitted through the capillary tube and material to the optical fiber contained therein.

7. A sensor system according to claim 6, wherein the thermal conductivity of said material is greater than 0.1 w/m-°k.

8. A sensor system according to claim 1, wherein said material is a fluid.

9. A sensor system according to claim 8, wherein said fluid is selected from the group consisting of water, glycerine, and oil.

10. A sensor system according to claim 8, further comprising reservoir means for providing a reservoir for expansion and contraction of said fluid and for maintaining said fluid at a specified pressure.

11. A sensor system according to claim 1, wherein said material is a polymer.

12. A sensor system according to claim 1, further comprising an optical source for providing said light signal, said optical fiber being interconnected to said optical source.

13. A sensor system according to claim 12, wherein said optical source is a light emitting diode.

14. A sensor system according to claim 1, wherein said capillary tube is made of a high strength material which is impervious to penetration by elements in the environment, said capillary tube being formed of material which is transmissible to temperature, but which is only slightly compressible and can withstand compressive forces without collapsing.

15. A sensor system for measuring acoustic pressure fluctuations in an environment, comprising:
an optical source for providing a light signal;
an array of serially coupled intrinsic fiber optic sensors, said sensors being Bragg gratings formed in a core of an optical fiber, said array being interconnected to said optical source by said optical fiber;
a capillary tubing structure;
said array and said optical fiber being deployed within said capillary tubing structure, and said capillary tubing structure being deployed in the environment; and
a high-density, low-compressibility material which completely fills all void spaces within said capillary tubing structure between an internal surface of said capillary tubing structure and said optical fiber, at least in an area of said capillary tubing structure containing said array;
wherein said material is responsive to a compressive force exerted on an external surface of said capillary tubing structure within the environment for providing a fluid force, and wherein each respective sensor in said array is responsive to said fluid force and said light signal for providing a respective sensing light signal indicative of said compressive force sensed by said respective sensor.

16. A sensor system according to claim 15, wherein said capillary tubing structure is hermetically sealed.

17. A sensor system according to claim 15, wherein said material is selected to be thermally conductive so that the temperature in the environment is accurately and rapidly transmitted through the capillary tubing and material to the array.

18. A sensor system according to claim 17, wherein the thermal conductivity of said material is greater than 0.1 w/m-°k.

19. A sensor system according to claim 15, wherein said material is a fluid.

20. A sensor system according to claim 19, wherein said fluid is selected from the group consisting of water, glycerine, and oil.

21. A sensor system according to claim 19, further comprising reservoir means for providing a reservoir for expansion and contraction of said fluid and for maintaining said fluid at a specified pressure.

22. A sensor system according to claim 15, wherein said material is a polymer.

23. A sensor system according to claim 15, wherein said optical source is a light emitting diode.

24. A sensor system according to claim 15, further comprising optical signal processing means responsive to each said respective sensing light signal for providing acoustic pressure signals indicative of variations in acoustic pressure in the environment adjacent to each said respective sensor element.

25. A fiber optic sensor means, comprising:
a tubularly-enclosed fluid means, responsive to a force, for providing a tubularly-enclosed fluid force; and
fluid force sensing means including an array of serially coupled intrinsic fiber optic sensor elements formed within an optical fiber, each respective one of said sensor elements being responsive to an optical signal, and further responsive to said tubularly-enclosed fluid force, for providing a fluid force sensing light signal, each sensing light signal being indicative of a force applied to said tubularly-enclosed fluid means at a location of said respective one of said sensor elements within said tubularly-enclosed fluid means.

26. A fiber optic sensor means according to claim 25, wherein said tubularly-enclosed fluid means includes a capillary tube filled with a high-density, low compressibility fluid.

27. A fiber optic sensor means according to claim 26, wherein said high-density, low compressibility fluid is selected from the group consisting of water, glycerine, and oil.

28. A fiber optic sensor means according to claim 26, further comprising reservoir means for providing a reservoir for expansion and contraction of said fluid and for maintaining said fluid at a specified pressure.

29. A fiber optic sensor means according to claim 26, wherein said optical fiber is deployed within said capillary tube.

30. A fiber optic sensor means according to claim 29, further comprising an optical source for providing said optical signal, said optical fiber being interconnected to said optical source.

31. A fiber optic sensor means according to claim 30, wherein said optical source is a light emitting diode.

32. A fiber optic sensor means according to claim 31, wherein each one of said sensor elements is a Bragg grating formed in a core of said optical fiber.

33. A fiber optic sensor means according to claim 31, wherein each one of said sensor elements is an interferometer including a respective pair of Bragg gratings formed in a core of said optical fiber and a sensing length of optical fiber positioned between said respective pair of Bragg gratings.

34. A fiber optic sensor means according to claim 31, wherein each one of sensor elements is a lazing element including a respective pair of Bragg gratings formed in a core of said optical fiber and a sensing length of doped optical fiber positioned between said respective pair of Bragg gratings.

35. A fiber optic sensor means according to claim 25, wherein each one of said sensor elements includes a Bragg grating formed in a core of said optical fiber.

36. A fiber optic sensor means according to claim 25, wherein each one of said sensor elements is an interferometer including a respective pair of Bragg gratings formed in a core of said optical fiber and a sensing length of optical fiber positioned between said respective pair of Bragg gratings.

37. A fiber optic sensor means according to claim 25, wherein each one of said sensor elements is a lazing element including a respective pair of Bragg gratings formed in a core of said optical fiber and a sensing length of doped optical fiber positioned between said respective pair of Bragg gratings.

38. A sensor system for sensing acoustic pressure in an environment, comprising:
- a capillary tubing structure including an array of serial coupled optical sensor elements formed within an optical fiber, said sensor elements and said optical fiber being deployed within a capillary tube, and said capillary tube being deployed in the environment; and
- a material which completely fills all void spaces within said capillary tubing structure between an internal surface of said capillary tube and said optical fiber, at least in an area of said capillary tube containing said sensor elements, said material reducing attenuation of acoustic pressure sensed through said capillary tube by at least 20 dB as compared to said capillary tube filled with air at 1 atmosphere ($1.01 \times 10^5$ n/m$^2$);
- wherein said material is responsive to an acoustic pressure exerted on an external surface of said capillary tube within the environment for providing a fluid force, and wherein said sensor elements are responsive to said fluid force and a light signal for each providing a sensing light signal indicative of said acoustic pressure.

39. A sensor system according to claim 38, wherein each one of said sensor elements is a Bragg grating formed in a core of said optical fiber.

40. A sensor system according to claim 38, wherein each one of said sensor elements is an interferometer including a respective pair of Bragg gratings formed in a core of said optical fiber and a sensing length of optical fiber positioned between said respective pair of Bragg gratings.

41. A sensor system according to claim 38, wherein each one of said sensor elements is a lazing element including a respective pair of Bragg gratings formed in a core of said optical fiber and a sensing length of doped optical fiber positioned between said respective pair of Bragg gratings.

42. A sensor system according to claim 38, wherein said material is a fluid selected from the group consisting of water, glycerine, and oil.

43. A sensor system according to claim 38, wherein said material is a pressurized gas.

44. A sensor system according to claim 38, wherein said material is a polymer.

* * * * *